United States Patent
Utaki

(10) Patent No.: US 7,640,722 B2
(45) Date of Patent: Jan. 5, 2010

(54) CABLE PROTECTION AND GUIDE DEVICE

(75) Inventor: Akihiko Utaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 12/193,746

(22) Filed: Aug. 19, 2008

(65) Prior Publication Data
US 2009/0077942 A1    Mar. 26, 2009

(30) Foreign Application Priority Data
Sep. 25, 2007    (JP)    ............ 2007-247648

(51) Int. Cl.
*F16G 13/16*    (2006.01)
(52) U.S. Cl. ............. 59/78.1; 59/900; 248/49
(58) Field of Classification Search ............ 59/78.1, 59/900; 248/49, 51
See application file for complete search history.

(56) References Cited

U.S. PATENT DOCUMENTS

| | | | |
|---|---|---|---|
| 7,305,815 B2 * | 12/2007 | Utaki et al. ............ | 248/51 |
| 7,317,160 B2 * | 1/2008 | Utaki ............ | 59/78.1 |
| 7,392,650 B2 * | 7/2008 | Utaki et al. ............ | 59/78.1 |
| 7,406,819 B2 * | 8/2008 | Utaki et al. ............ | 248/49 |
| 7,428,808 B2 * | 9/2008 | Utaki et al. ............ | 59/78.1 |

FOREIGN PATENT DOCUMENTS

JP    4111987    8/2008

* cited by examiner

*Primary Examiner*—David B Jones
(74) *Attorney, Agent, or Firm*—Woodling, Krost and Rust

(57) ABSTRACT

A cable protection and guide device is disclosed in which connection strength of the side plate portions is improved. The strength of connecting portions is improved and large scale assembly of the device is possible. Side plate portions (110) each have a link module (120) with integrally molded side plates (122) of a predetermined number interconnected by coupling portions (124). Each coupling portion includes flexible coupling arms (126) extended from the coupling portions (124). Stopper links (130) each being engaged between the adjacent side plates from a cable accommodating space side and are assembled to the coupling portion by a snap-fit mechanism. The link module has a male connecting plate (127) and a female connecting plate (128), which are respectively connected to link modules, which are reside at respective ends of the male connecting plate and the female connecting plate. The male connecting plate and the female connecting plate are each formed in the same outer shape as that of the side plate when connected to a female connecting plate and a male connecting plate of the adjacent link module.

4 Claims, 16 Drawing Sheets

CABLE PROTECTION AND GUIDE DEVICE

This patent application claims priority to Japanese Patent Application Serial No. 2007-247648 filed Sep. 25, 2007.

TECHNICAL FIELD

The present invention relates to a cable protection and guide device, and more specifically it relates to a cable protection and guide device suitable for accommodating a cable such as a cable (cables), a hose (hoses), which supplies a movable portion of an industrial machine with energy such as electric power or compressed air.

BACKGROUND TECHNOLOGY

The present inventors have developed a cable protection and guide device 500, as shown in FIG. 15, in which a number of pairs of spaced right and left side plate portions 510 are connected to each other from a mounting fixed end to a mounting movable end. Connecting arms 540 are respectively bridged over a flexional inner circumferential side and a flexional outer circumferential side of the side plate portions 510 at predetermined intervals. A cable is accommodated in a cable accommodating space surrounded by the side plate portions 510 and the connecting arms 540 from the mounting fixed end toward the mounting movable end. The side plate portion 510 has a link module 520 having an integrally molded side plate 522 of a predetermined number through a coupling portion 524 and a stopper link 530.

In this cable protection and guide device 500, the connection of link modules 520 are made as follows. As shown in FIG. 16, at one end of the link module 520 is formed a connecting hook 527 having an outer shape similar to the shape of a coupling portion 524. This connecting hook 527 has an arc-shaped cut out portion 527c at a side end portion. The portion extended from a cable accommodating space side coupling arm 526 is formed as an arc-shaped convex portion (not shown) having the same shape as an element formed on a cable accommodating space side of the coupling portion 524.

At the other end portion of the link module 520 is formed a connecting plate 528. Further, on an outer side surface of this connecting plate 528 and at a portion extended from the coupling arm 526 there is formed an arc-shaped convex portion 528c, which overlaps the arc-shaped cut out portion 527c formed on the connecting hook 527. Further, on a cable accommodating space side surface of the connecting plate 528 and at a position which is a surface symmetry with a position where the arc-shaped convex portion 528c with respect to the connecting plate 528 is formed an arc-shaped convex portion 528d having the same shape as that of the arc-shaped convex portion 528c as shown in FIG. 15.

The connecting hook 527 and the connecting plate 528 are met so that as shown in FIG. 16, the arc-shaped cut out portion 527c of the connecting hook 527 and the arc-shaped convex portion 528c of the connecting plate 528 are overlapped with each other. An upper convex portion 527a provided on an upper portion of the connecting hook 527 and an upper concave portion 531 provided on a coupling portion lower supporting portion 534 of the stopper link 530 are engaged with each other whereby a snap-fit mechanism is formed. Two link modules 520 are connected to each other. Then a back surface of the connecting hook 527 that includes an arc-shaped convex portion extended from a cable accommodating space side coupling arm 526 engages an arc-shaped cut out portion 528e formed at a side end portion of the connecting plate 528 and at an arc portion 539 of the stopper link 530 (see Japanese patent application No. 2007-27921).

PROBLEMS TO BE SOLVED BY THE INVENTION

In the cable protection and guide device 500, the connection of the link modules 520 is performed by engaging the connecting hook 527 having the same outer shape as that of the coupling portion 524 and the connecting plate 528 provided on both ends of the link plate 520. The coupling portion upper supporting portion 533 and the coupling portion lower supporting portion 534 of the stopper link 530 use a snap-fit mechanism, but sufficient connection strength could not be obtained.

When link modules 520 are connected to each other the connecting hook 527 and the connecting plate 528 are overlapped with each other and they are engaged between the coupling portion upper supporting portion 533 and the coupling portion lower supporting portion 534 of the stopper link 530. Thus three parts must be assembled at once and assembly is difficult. Further, since the three parts are fixed at a position while overlapped, the wall thickness of the respective connecting portions becomes thin so that sufficient part strength was not obtained.

When only the link module 520 is previously assembled, the connecting hook 527 and the connecting plate 528 are liable to be disengaged from each other. It was impossible to perform a batch assembly operation (large assembly operation of many units) since a fixing mechanism (disengagement mechanism) of the both elements does not exist.

Accordingly, the present invention provides a cable protection and guide device in which connection strength of side plate portions is improved. The strength of connecting portions is improved and a batch treatment assembly operation (large scale assembly operation) is possible.

MEANS FOR SOLVING THE PROBLEMS

A cable protection and guide device includes a number of pairs of spaced right and left side plate portions connected to each other from a mounting fixed end to a mounting movable end. Connecting arms are respectively bridged over a flexional inner circumferential side and a flexional outer circumferential side of the side plate portions at predetermined intervals. A cable is accommodated in a cable accommodating space surrounded by the side plate portions and the connecting arms from the mounting fixed end toward the mounting movable end. The link module includes side plates or side plate portions integrally molded and connected to each other by a predetermined number of coupling portions. Flexible coupling arms extend from the coupling portions joining the side plates. Stopper links are engaged between the adjacent side plates from a cable accommodating space side and assembled to the coupling portion by a snap-fit mechanism. The link module has a male connecting plate and a female connecting plate which are connected to other link modules. The connecting plates interengage other connecting plates of other link modules. The male connecting plate and the female connecting plate are each formed in the same outer shape as that of the side plate when respectively connected to a female connecting plate and a male connecting plate of the adjacent link module.

It is noted that the language side plates of a predetermined number in the link modules each have side plates integrally molded and connected by coupling portions and flexible coupling arms extending from the coupling portions in the present invention contains a case of zero "0" of the side plate. That is a link module, which is a component of the present invention involves a male connecting plate and a female connecting plate, which connect adjacent link modules, on both sides of a flexible coupling arm extended from a coupling portion.

The male connecting plate and the female connecting plate, which respectively connect the adjacent link modules to each other, have a convex portion and a concave portion at the centers of end surfaces, respectively, The male and female connecting plates have rotation type snap-fit mechanisms which are connected by engaging between the convex portion and the concave portion and then rotating the male connecting plate and the female connecting plate in opposite directions to each other.

A first connecting arm having first and second ends is bridged on a flexional outer circumferential side of the side plate portions. The second connecting arm is integrally molded on a flexional inner circumferential side of a pair of right and left the stopper links as a fixed connecting arm. The first end of the first connecting arm which is bridged over the flexional outer circumferential side of the side plate portions is flexibly integrally molded with one of the pair of right and left stopper links. The second end of the first connecting arm bridged over the flexional outer circumferential sides of the side plate portions is removably affixed with the other of the pair of right and left stopper links as an opening/closing connecting arm.

EFFECTS OF THE INVENTION

Link modules include a number of pairs of spaced right and left side plate portions are connected to each other from a mounting fixed end to a mounting movable end. Connecting arms are respectively bridged over a flexional inner circumferential side and a flexional outer circumferential side of the side plate portions at predetermined intervals. A cable can be accommodated in a cable accommodating space surrounded by the side plate portions and the connecting arms from the mounting fixed end toward the mounting movable end.

Side plate portions each have a link module with integrally molded side plates of a predetermined number. The side plates portions are interconnected with each other by coupling portions and flexible coupling arms extended from the coupling portions. Stopper links each being engaged between the adjacent side plates from a cable accommodating space side are assembled to the coupling portion by a snap-fit mechanism. The link module has a male connecting plate and a female connecting plate which are respectively connected to other link modules adjacent the respective ends of the link modules. The male connecting plate and the female connecting plate are each formed in the same outer shape as that of the side plate when connected to a female connecting plate and a male connecting plate of the adjacent link module. A connecting portion between the link modules can be provided at position different from an engagement portion between the coupling portion and the stopper link. Thus the connection strength is increased. And since wall thicknesses of the male connecting plate and the female connecting plate can be equalized to the wall thickness of the wall plate, the strength of the parts is also increased.

The male connecting plate and the female connecting plate which respectively connect the adjacent link module to each other, have a convex portion and a concave portion at the centers of end surfaces, respectively. The male connecting plate and the female connecting plate have rotation type snap-fit mechanisms which are connected by engaging between the convex portion and the concave portion and then rotating the male connecting plate and the female connecting plate in opposite directions to each other. The connection between link modules is performed early in the assembly process and assembly of the stopper link can be performed later. Therefore, assembly is simple and large scale assembly can be performed. After assembly, replacement of the link module with a different link module having a different number of side plates can be easily made. Thus, the whole length of the cable protection and guide device can be easily changed and the operability thereof is improved.

Further, the connection between the link modules is performed in a rotational direction having no relation to an operating direction of the cable protection and guide device. After the connection, force applied to the operating direction is received by pawl portions provided at upper and lower portion of a convex portion and a concave portion, forming a rotation type snap-fit mechanism. Thus the strength and the endurance of the device is good.

A first connecting arm bridged on the flexional outer circumferential side of the side plate portions is integrally molded at one end thereof. A fixed second connecting arm on the flexional inner circumferential side links the pair of right and left stopper links together. The end of the first connecting arm bridged over on a flexional outer circumferential side of the side plate portions is flexibly and integrally molded with one of the pair of right and left stopper links and the other end of the first connecting arm bridged over the flexional outer circumferential side of the side plate portions is removably affixed to the other of the pair of right and left stopper links as an opening/closing connecting arm. A pair of right and left stopper links and upper and lower two connecting arms form a part.

A cable protection and guide device includes a number of pairs of spaced right and left side plate portions connected to each other from a mounting fixed end to a mounting movable end. Connecting arms are respectively bridged over a flexional inner circumferential side and a flexional outer circumferential side of the side plate portions at predetermined intervals. A cable is accommodated in a cable accommodating space surrounded by the side plate portions and the connecting arms from the mounting fixed end toward the mounting movable end. The side plate portions each have a link module with integrally molded side plates connected by coupling portions. Each of the coupling portions includes flexible coupling arms extended from the coupling portions. Stopper links engaged between adjacent side plates from a cable accommodating space side are assembled to the coupling portion by a snap-fit mechanism. The link module has a male connecting plate and a female connecting plate which are respectively connected to other link modules having mating connecting plates. The male connecting plate and the female connecting plate are each formed in the same outer shape as that of the side plate when respectively connected to a female connecting plate and a male connecting plate of the adjacent link module. The connection strength of the plate portions is improved.

DESCRIPTION OF THE INVENTION

Engineering plastic resins such as polyamide 6, polyamide 12, polyamide 46, polyamide 66, acryl, polyacetal and the like materials are used for the link module, the stopper link, the connecting arm and the like used in the cable protection and guide device of the present invention. These materials resist flexional strain liable to occur at the time of a flexional operation to exhibit dimensional stability excellent in a cable retention form. These materials are exceptionally good when they are molded by use a fatigue resistant resin material in which elastomer or rubber component is mixed with polyamide resin or polybutylene terephthalate. The elastomer or the rubber component is mixed with polyamide resin or polybutylene terephthalate which adds flexibility and withstands shock. The shock resistance and fatigue resistance excellent to repeated flexion are good. Thus the elastomer or the rubber component is preferably used.

A cable protection and guide device, which is an embodiment of the present invention, will be described by use of FIGS. 1 to 14 below.

Figure 1:
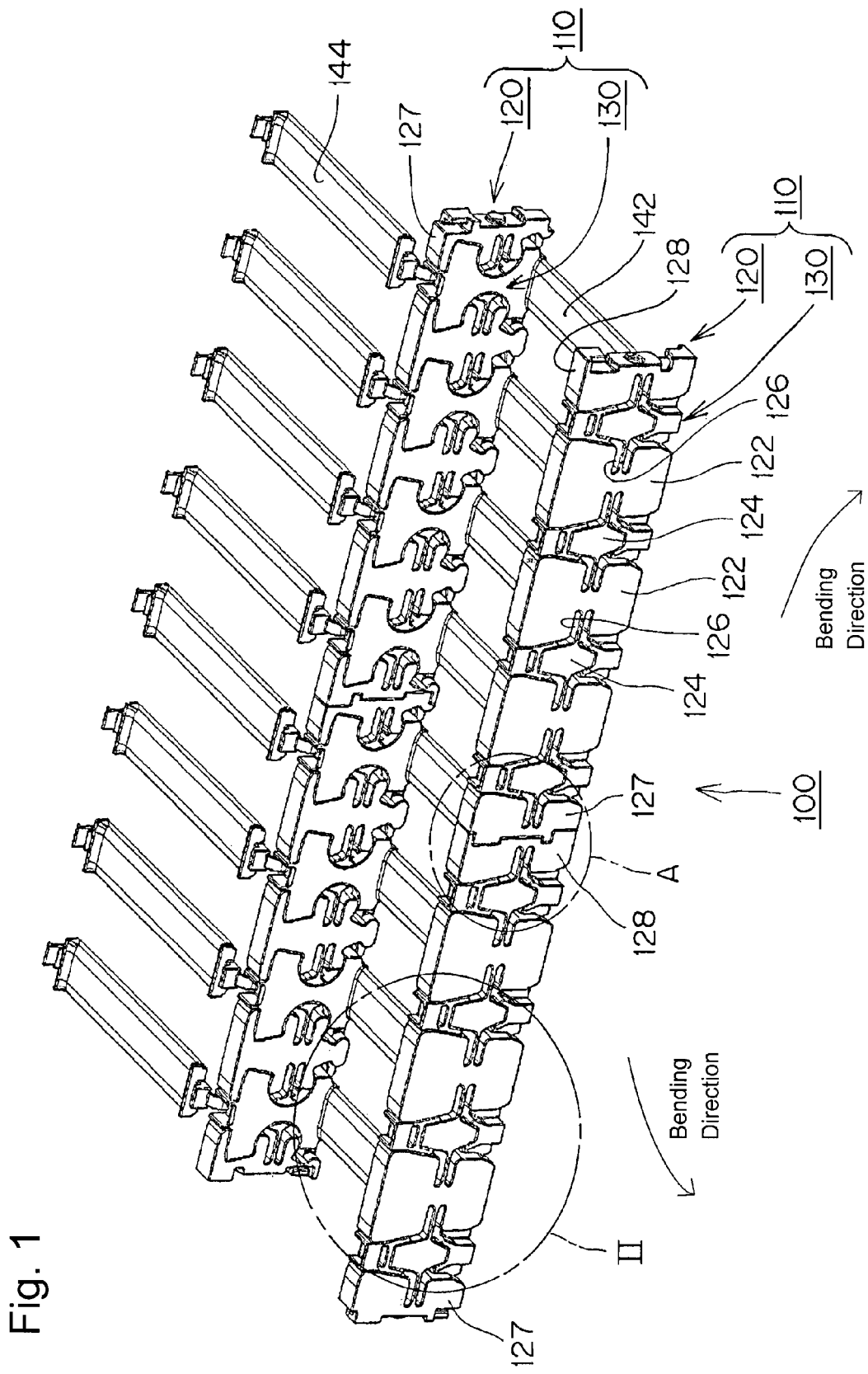
FIG. 1 is a perspective view showing a part of a cable protection and guide device 100 of the present invention.
Figure 2:
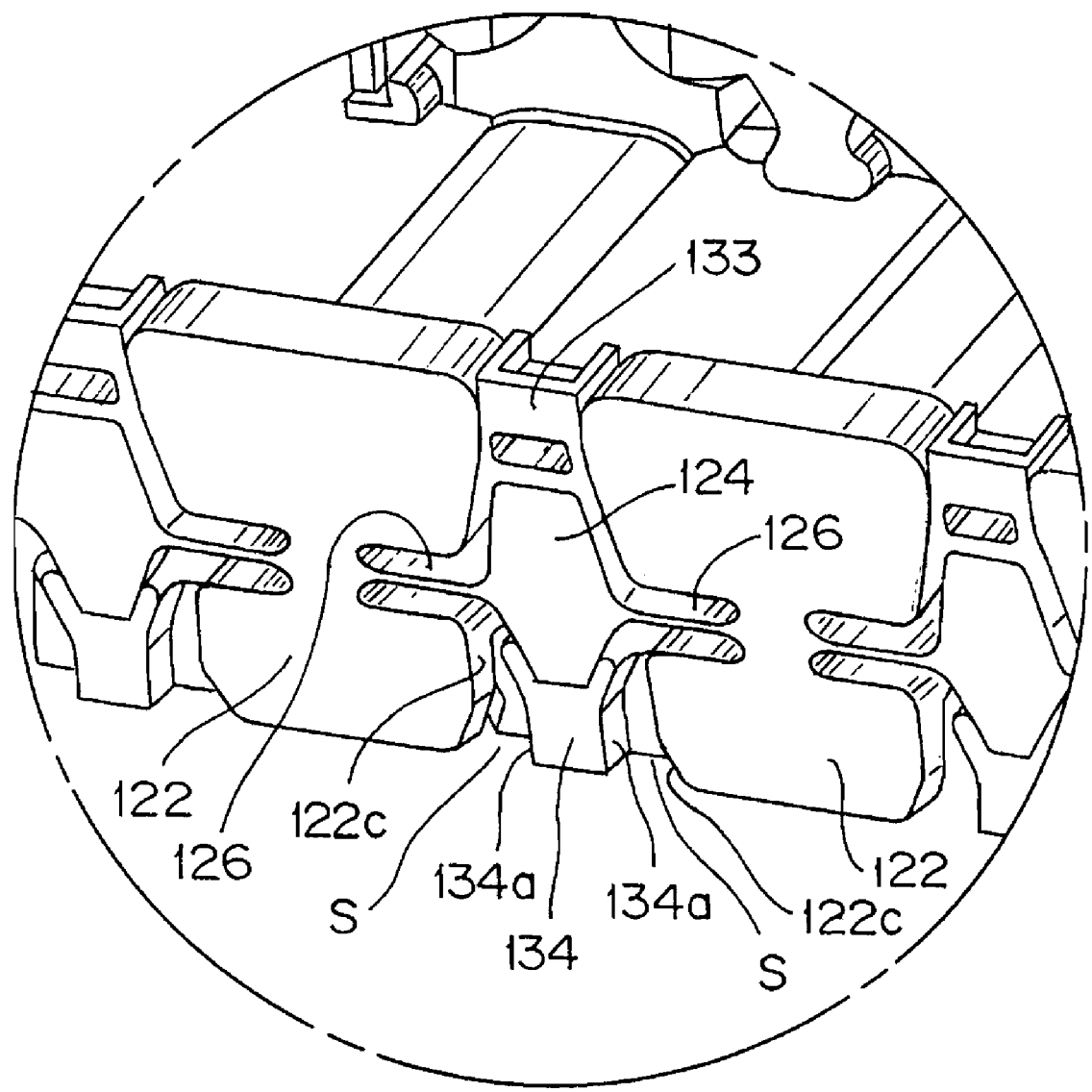
FIG. 2 is an enlarged view of a portion, II, in FIG. 1.
Figure 3:
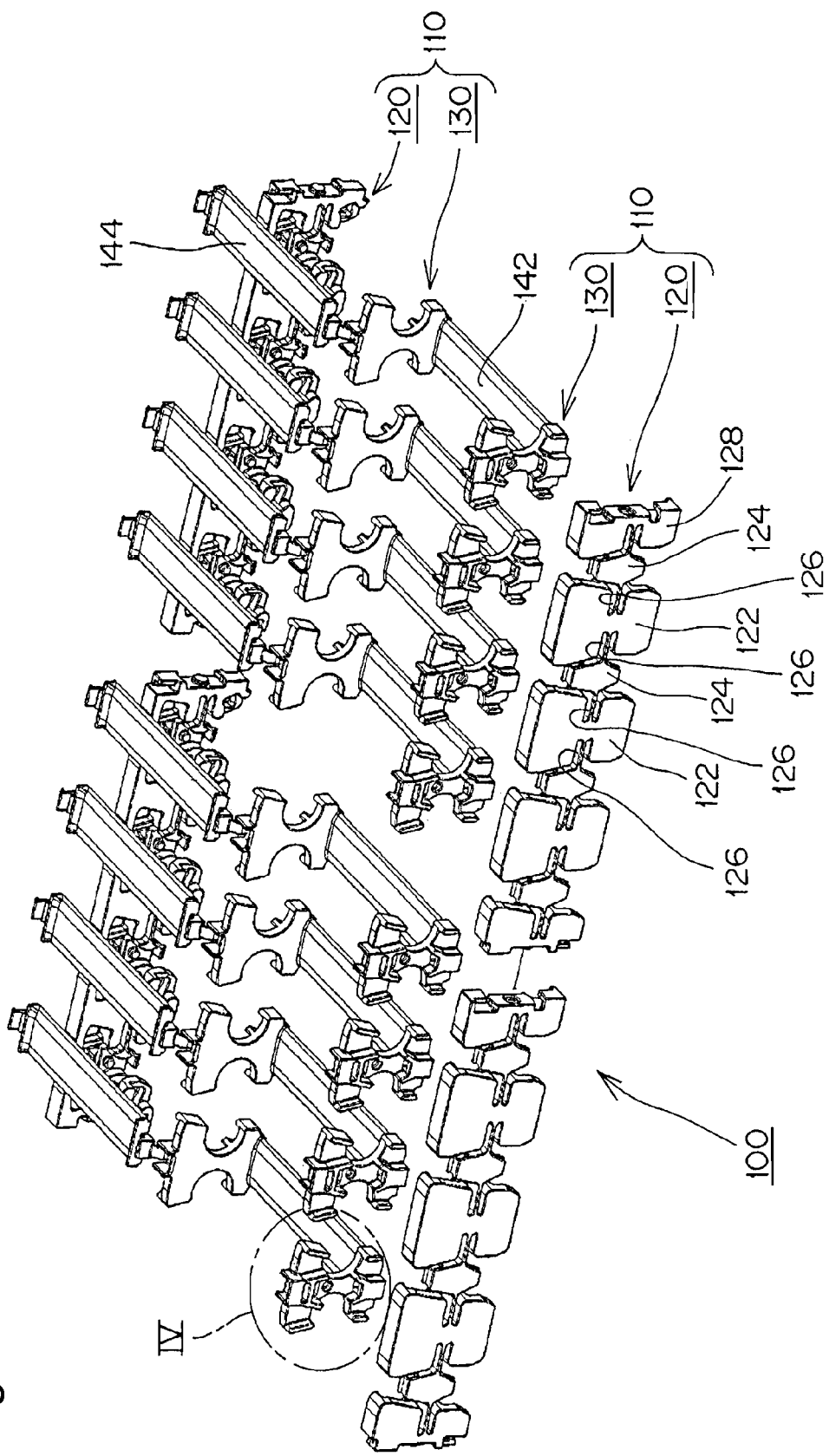
FIG. 3 is an exploded view of the cable protection and guide device 100 shown in FIG. 1.
Figure 4:
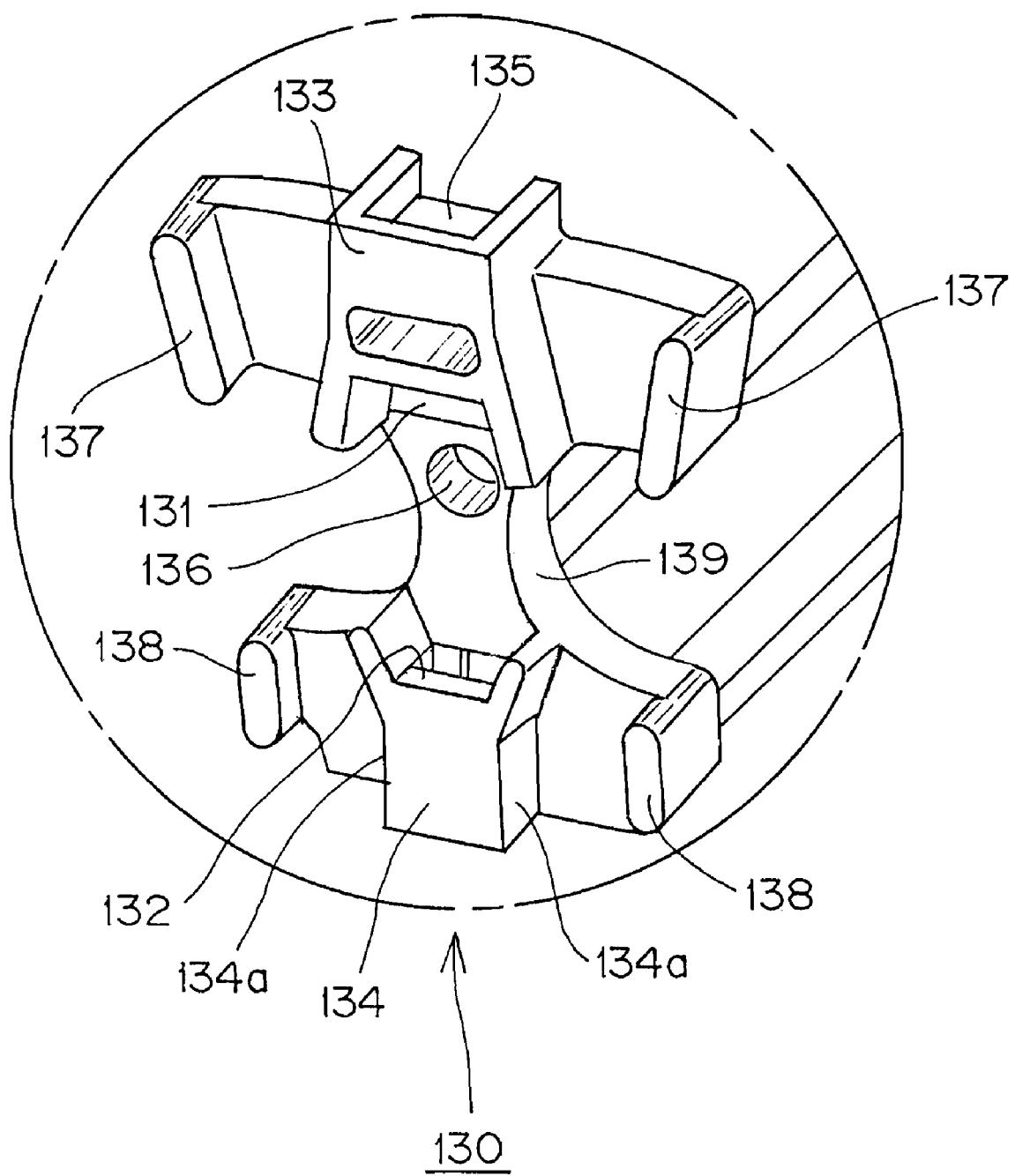
FIG. 4 is an enlarged view of a portion, IV, in FIG. 3.
Figure 5:
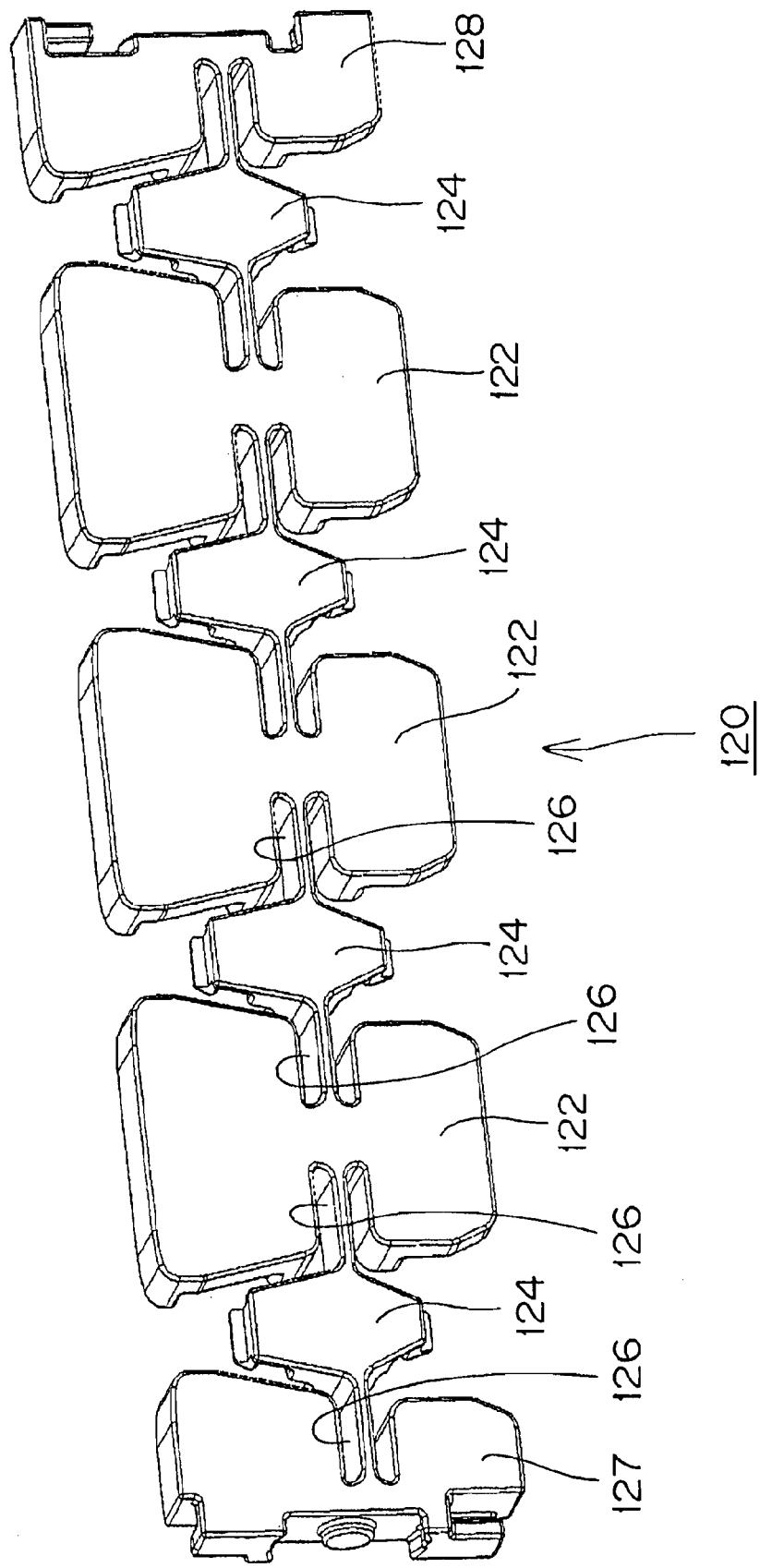
FIG. 5 is a perspective view when a link module is viewed from the outside.
Figure 6:
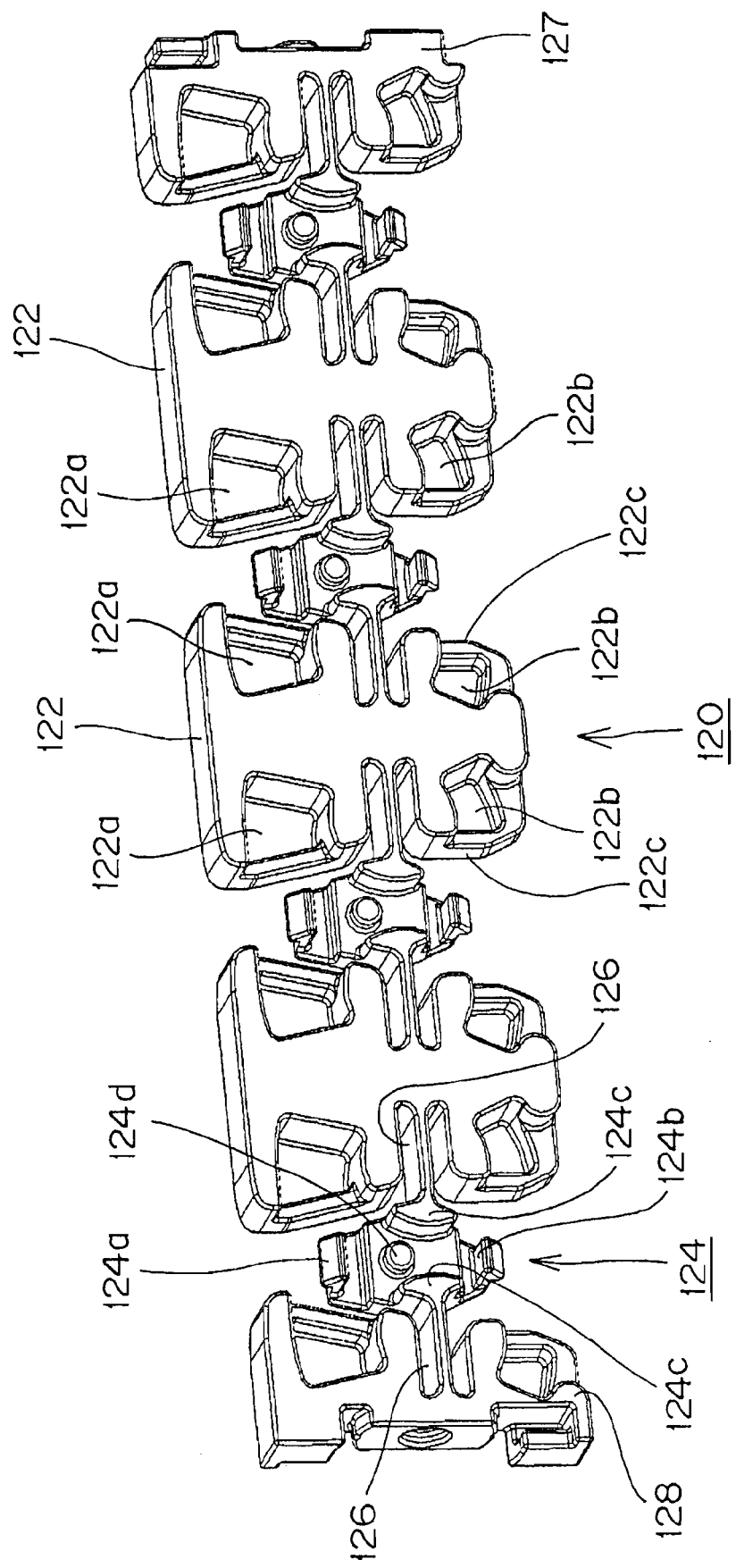
FIG. 6 is a perspective view when the link module is viewed from the inside.
Figure 7:
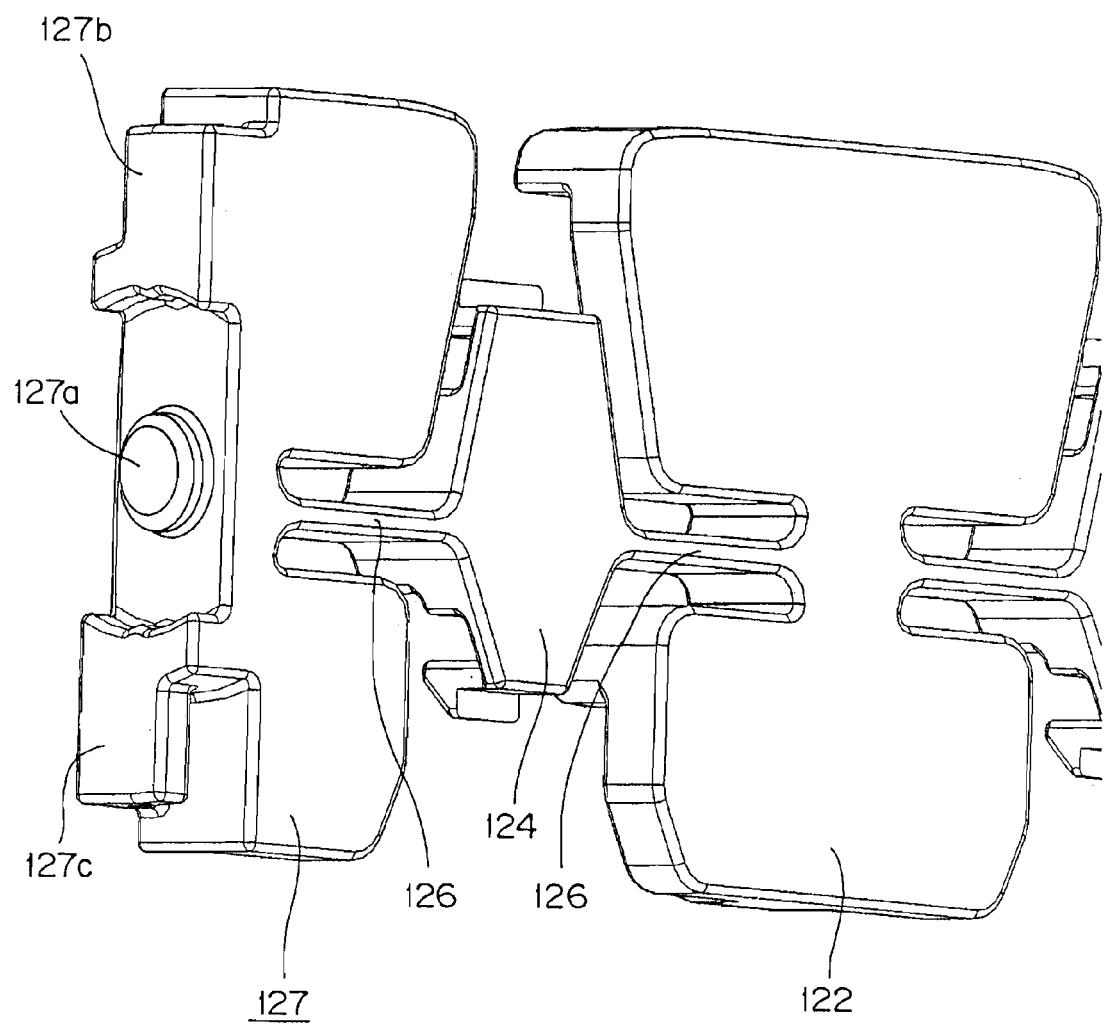
FIG. 7 is an enlarged perspective view of a male connecting plate.
Figure 8:
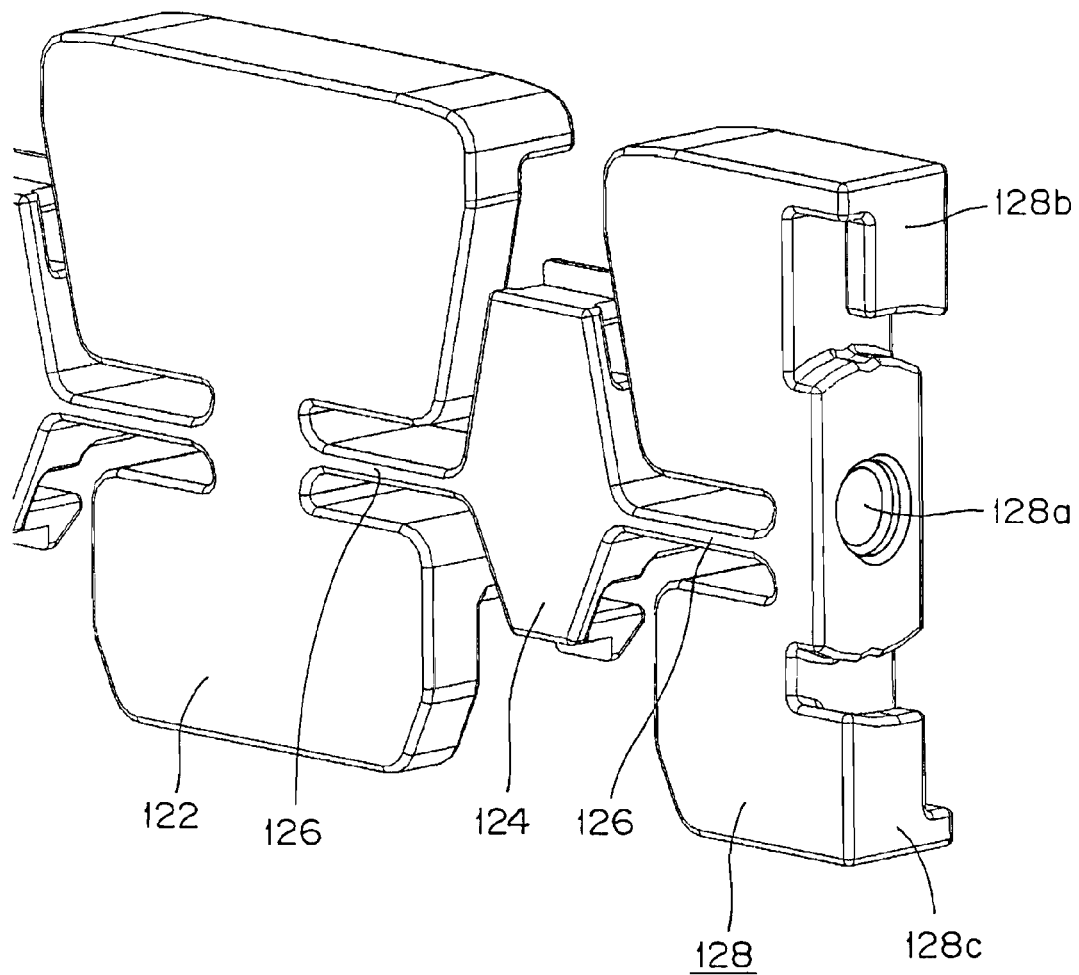
FIG. 8 is an enlarged perspective view of a female connecting plate.
Figure 13:
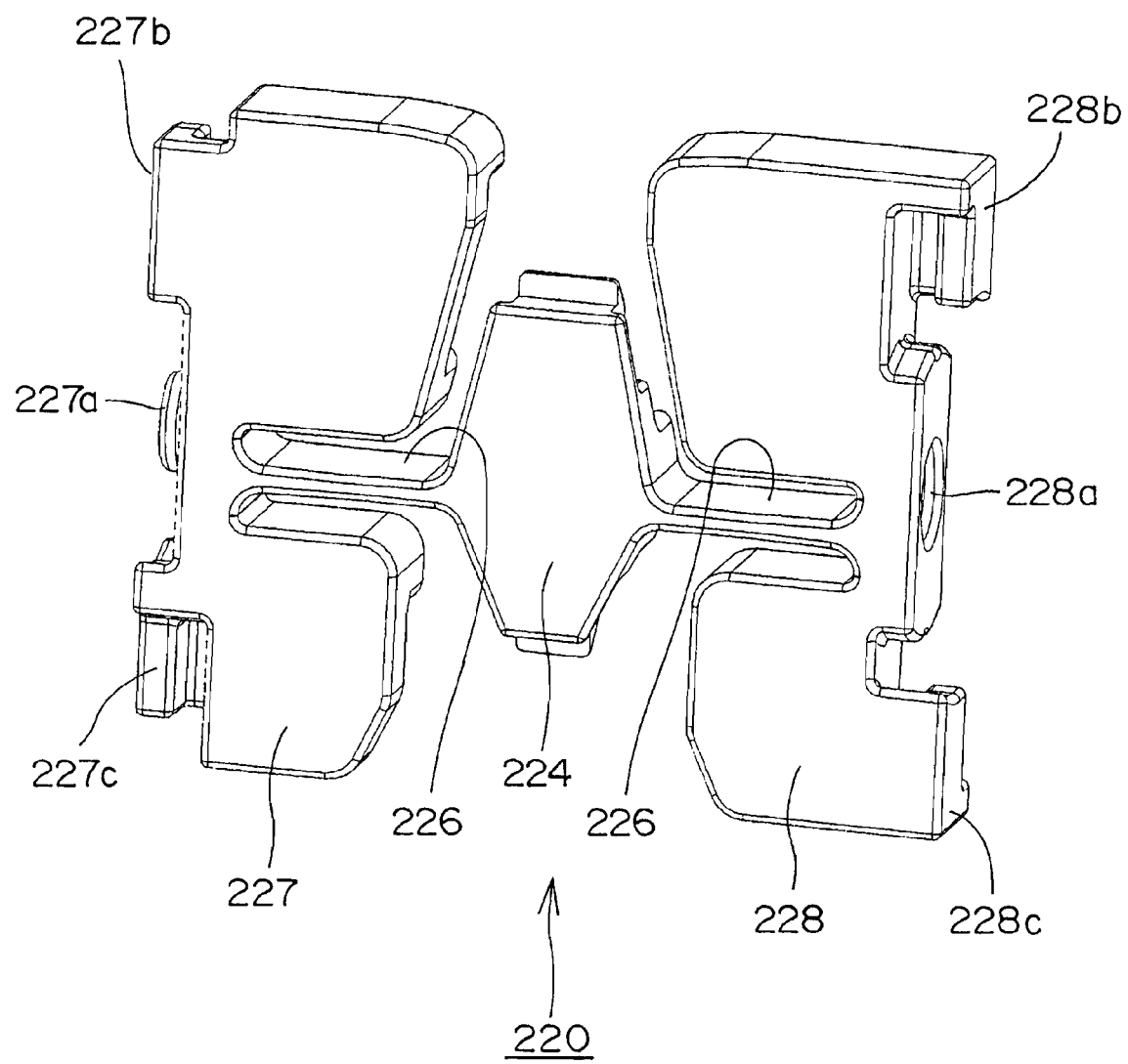
FIG. 13 is a perspective view obtained when another shaped link module is viewed from the outside.
Figure 14:
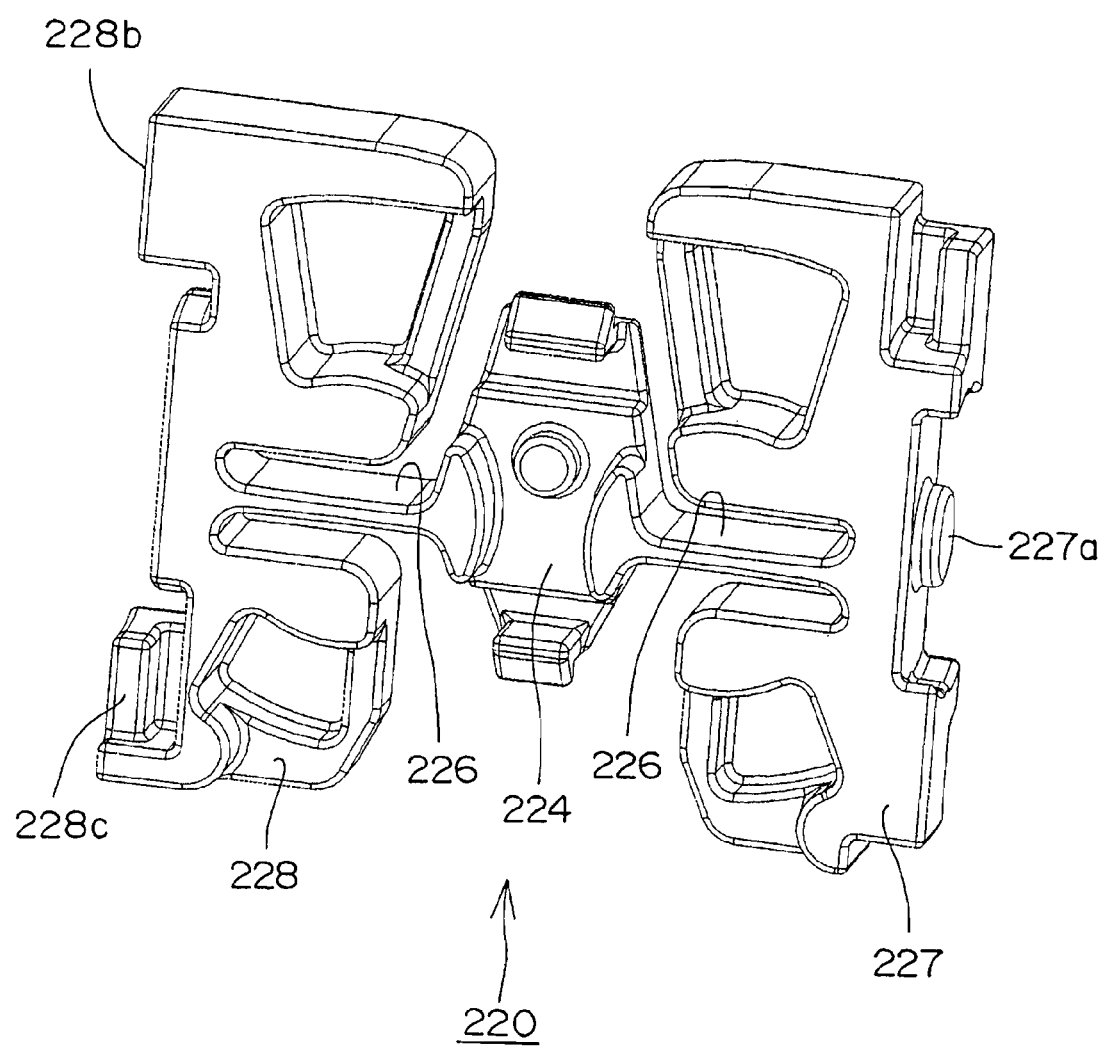
FIG. 14 is a perspective view of the link module shown in FIG. 13 viewed from the inside.
Figure 15:
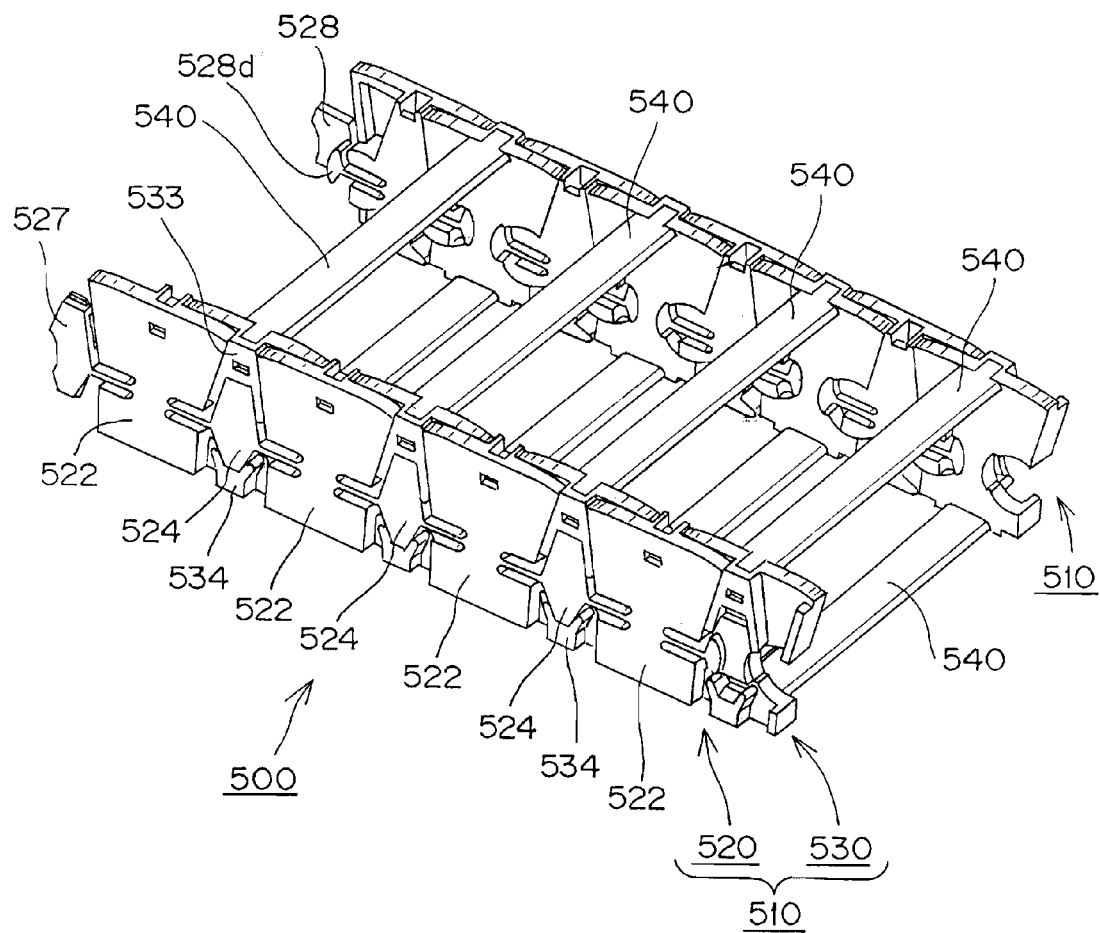
FIG. 15 is a perspective view of a conventional cable protection and guide device.
Figure 16:
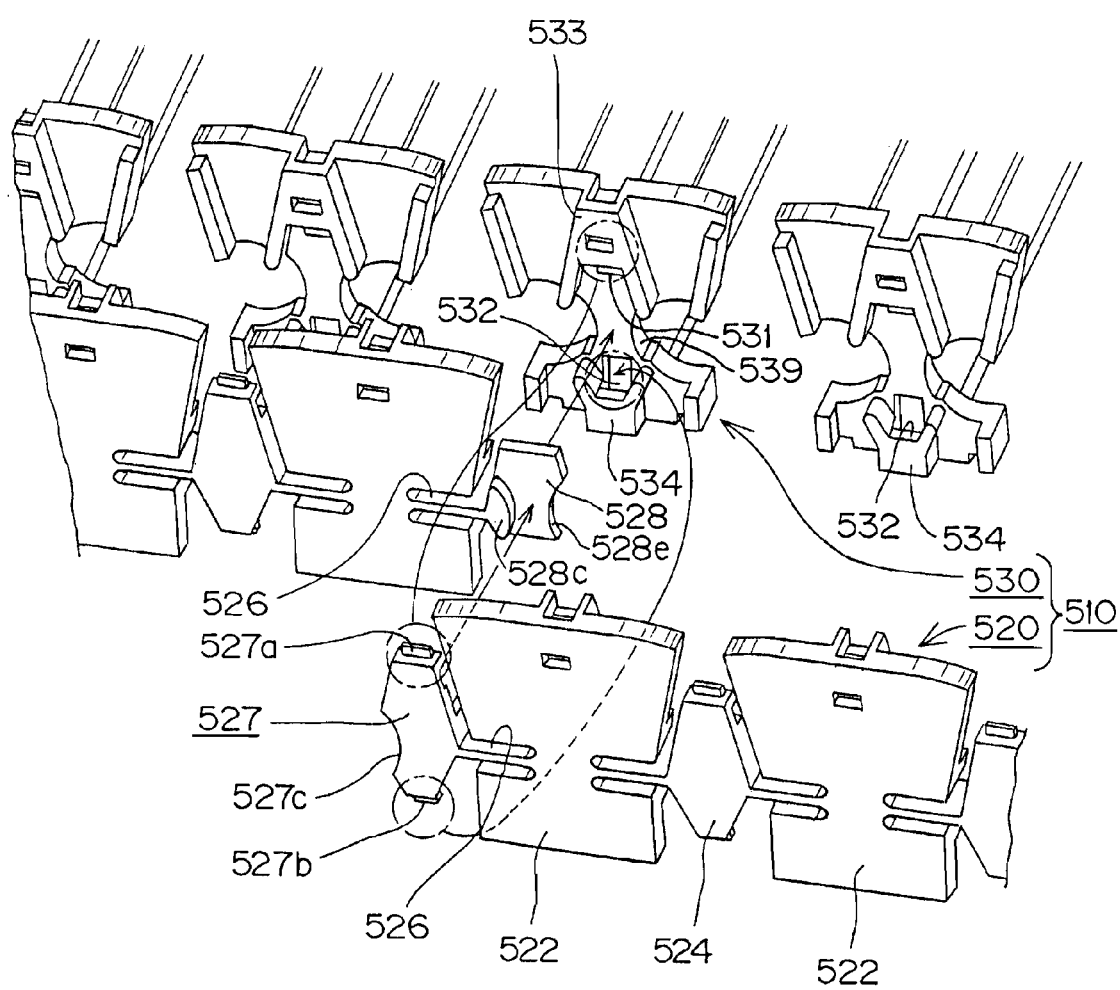
FIG. 16 is a perspective view of a connection method of link modules of the cable protection and guide device shown in FIG. 15.

FIG. 1 is a perspective view in which a cable protection and guide device 100 of the present example is shown with an opening/closing connecting arm 144 opened, FIG. 2 is an enlarged view of II portion in FIG. 1, FIG. 3 is an exploded view before link modules 120 and stopper links 130 are assembled, FIG. 4 is an enlarged view of IV portion in FIG. 3, FIG. 5 is a perspective view when the link module 120 was viewed from the outside, FIG. 6 is a perspective view when the link module 120 shown in FIG. 5 was viewed from the inside that is from a cable accommodating space side, FIG. 7 is an enlarged perspective view of a male connecting plate 127, FIG. 8 is an enlarged perspective view of a female connecting plate 128, and FIGS. 9 to 12 are state views shown when the male connecting plate 127 and the female connecting plate 128 are connected to each other by a rotation type snap-fit mechanism. And FIG. 13 is a perspective view when another shaped link module 220 is viewed from the outside, FIG. 14 is a perspective view of the link module 220 shown in FIG. 13 viewed from the inside that is from a cable accommodating space side.

The cable protection and guide device 100 of the present example is used for protecting and guiding a cable such as an electric cable, which connects between a stationary portion and a movable portion in a semiconductor device, a pharmaceutical development testing device, a vehicle door opening/closing device and the like, transmits electric signals and supplies power, and a hose, which supplies pressure liquid or pressure air. And in the cable protection and guide device 100, a number of pairs of spaced right and left side plate portions 110 are connected to each other from a mounting fixed end, which is secured to a stationary portion, toward a mounting movable end, which is secured to a movable portion, fixed connecting arms 142 and opening/closing connecting arms 144 are respectively bridged over a flexional inner circumferential side and a flexional outer circumferential side of the side plate portions 110 at predetermined intervals and a cable (not shown) is accommodated in a cable accommodating space exhibiting a rectangular cross section, surrounded by pairs of right and left side plate portions 110, fixed connecting arms 142 and opening/closing connecting arms 144 from the mounting fixed end toward the mounting movable end.

It is noted that although FIG. 1 and FIG. 3 do not show a mounting fixed end and a mounting movable end, the term "from the mounting fixed end toward the mounting movable end" means "a longitudinal direction".

And the side plate portion 110 has a link module 120 having a required number of side plates 122 integrally molded through diamond-shaped coupling portions 124 and flexible coupling arms 126 extended from these coupling portions 124, and stopper links 130 each being engaged with side plates 122 therebetween from the cable accommodating space and incorporated to the coupling portion 124 by a snap-fit mechanism. In this example the number of side plates 122 forming one link plate 120 is three.

Further, as shown in FIG. 3, a fixed connecting arm 142 is integrally molded to a flexional inner circumferential side a pair of right and left stopper links 130. And an end of an opening/closing connecting arm 144 is flexibly, integrally molded to a flexional outer circumferential side of the pair of right and left stopper links 130 and the other end of the opening/closing connecting arm 144 is removably molded to the other flexional outer circumferential side of the pair of right and left stopper links 130. As a result a pair of right and left stopper links 130, a fixed connecting arm 142 and an opening/closing connecting arm 144 form one part. Thus the number of parts is reduced and a parts controlling load is also reduced. Therefore, since the pair of right and left stopper links 130 becomes independent, an assembly operation load is more reduced.

Here a connection structure between the link module 120 and the stopper link 130 and its function will be described.

As shown in FIGS. 1 to 3, the stopper link 130 is incorporated to a coupling portion 124 of the link module 120 from a cable accommodating space side by a snap-fit mechanism whereby the flexional inner circumferential side and flexional outer circumferential side flexional angles are restricted.

In the present example, an upper end convex portion 124a provided on an upper end portion of the diamond-shaped coupling portion 124 shown in FIG. 6 is engaged with an upper concave portion 131 provided on an upper portion of the stopper link 130 shown in FIG. 4. At the same time a lower end convex portion 124b provided on a lower end portion of the coupling portion 124 is engaged with a lower concave portion 132 provided on a lower portion of the stopper link 130, so that a snap-fit mechanism is formed. At this time, a cylindrical columnar convex portion 124d protrudently provided at a slightly upper portion of the center of the coupling portion 124 shown in FIG. 6 is fitted to a circular recess portion 136 provided at a slightly upper portion of the center of the stopper link 130 shown in FIG. 4 so that the connection between the coupling portion 124 and the stopper link 130 is strengthened.

Upper portion side convex portions 137 of the stopper link 130 shown in FIG. 4 are accommodated into the back side of a side plate 122 shown in FIG. 6, that is, the upper engagement regions 122a formed on upper right and left portions on the cable accommodating space side. At the same time, lower portion side convex portions 138 of the stopper link 130 shown in FIG. 4 are accommodated into lower engagement regions 122b formed on lower right and left portions of a back side of the side plate 122 as shown in FIG. 6. An arc-shaped convex portion 124c formed on the cable accommodating space side of the coupling portion 124 shown in FIG. 6 abuts on an arc-shaped portion 139 of the stopper link 130.

FIG. 4 illustrates the stopper link 130 integrally molded into a coupling upper supporting portion 133 and a coupling lower supporting portion 134 which supports coupling portion 124 formed between the side plates 122 of the link module 120. As shown in FIG. 2, the coupling upper supporting portion 133 fits into adjacent side plates 122 and 122 and the upper portion of the coupling portion 124 is formed between the adjacent side plates 122 and 122. Such a structure restricts a flexional outer circumferential side of the cable protection and guide device 100 so that the flexional outer circumferential side is not flexed beyond a substantially straight line. It is noted that a portion denoted by the reference numeral 135 in FIG. 4 is an engagement concave portion with which an opening/closing end of the opening/closing connecting arm 144 is engaged.

The coupling portion lower supporting portion 134 abuts on a lower portion of the coupling portion 124 formed between adjacent side plates 122 and 122. Clearances S are shown between side plates 134a of the coupling portion lower supporting portion 134 shown in FIG. 4 and lower side surfaces 122c of the adjacent side plates 122 and 122. As shown in FIG. 2, a side plate 134a of the coupling portion lower supporting portion 134 abuts on a lower side surface 122c of the side plate 122 to restrict the flexional angle on a flexional inner circumferential side of the cable protection and guide device. Therefore, excessive flexional stress is not applied to the coupling arm 126 resulting in improved endurance of the device.

Next, a connection mechanism between link modules 120 will be described. A link module 120 has a male connecting plate 127 and a female connecting plate 128, which are respectively connected to other link modules adjacent to both ends as shown in FIGS. 5 and 6. When the male connecting plate 127 and the female connecting plate 128 are respectively connected to a female connecting plate 128 and a male connecting plate 127 of adjacent link modules 120, they have the same outer shape as that of the side plate 122 shown in portion, A, of FIG. 1.

The male connecting plate 127 is provided at one end of the link module 120 as shown in FIG. 7. The outer shape of the male connecting plate 127 is cut at a vertical center line and has a cylindrical columnar convex portion 127a at the center of its end surface. Upper engagement pawl portion 127b and a lower engagement pawl portion 127c are integrally molded at upper and lower point symmetrical positions using convex portion 127a as the center.

The female connecting plate 128 is provided at the other end of the link module 120 as shown in FIG. 8. The outer shape of the female connecting plate 128 also has such an outer shape cut at a vertical center line and has a circular concave portion 128a at the center of its end surface. An upper engagement pawl portion 128b and a lower engagement pawl portion 128c are integrally molded at upper and lower point symmetrical positions using this concave portion 128a as the center.

Figure 9:
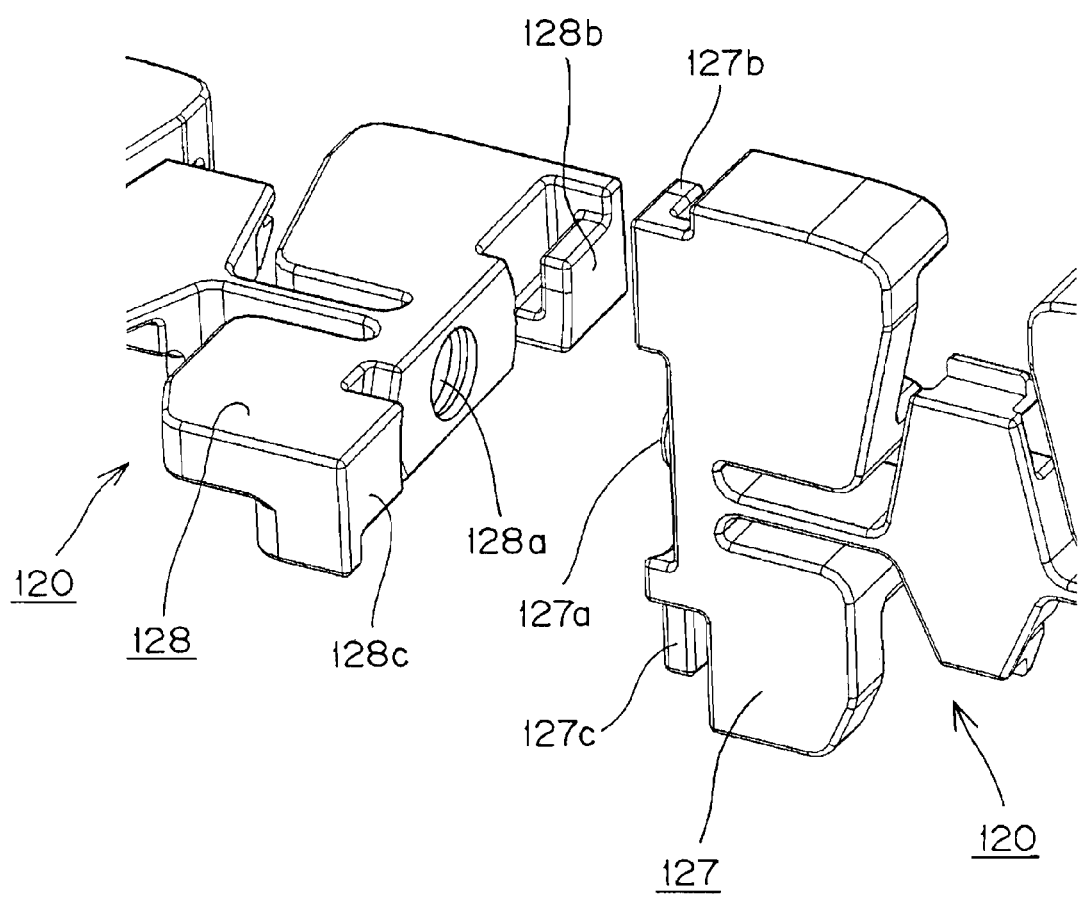
FIG. 9 is a view obtained when the male connecting plate and the female connecting plate are connected by a rotation type snap-fit mechanism (before connection).
Figure 10:
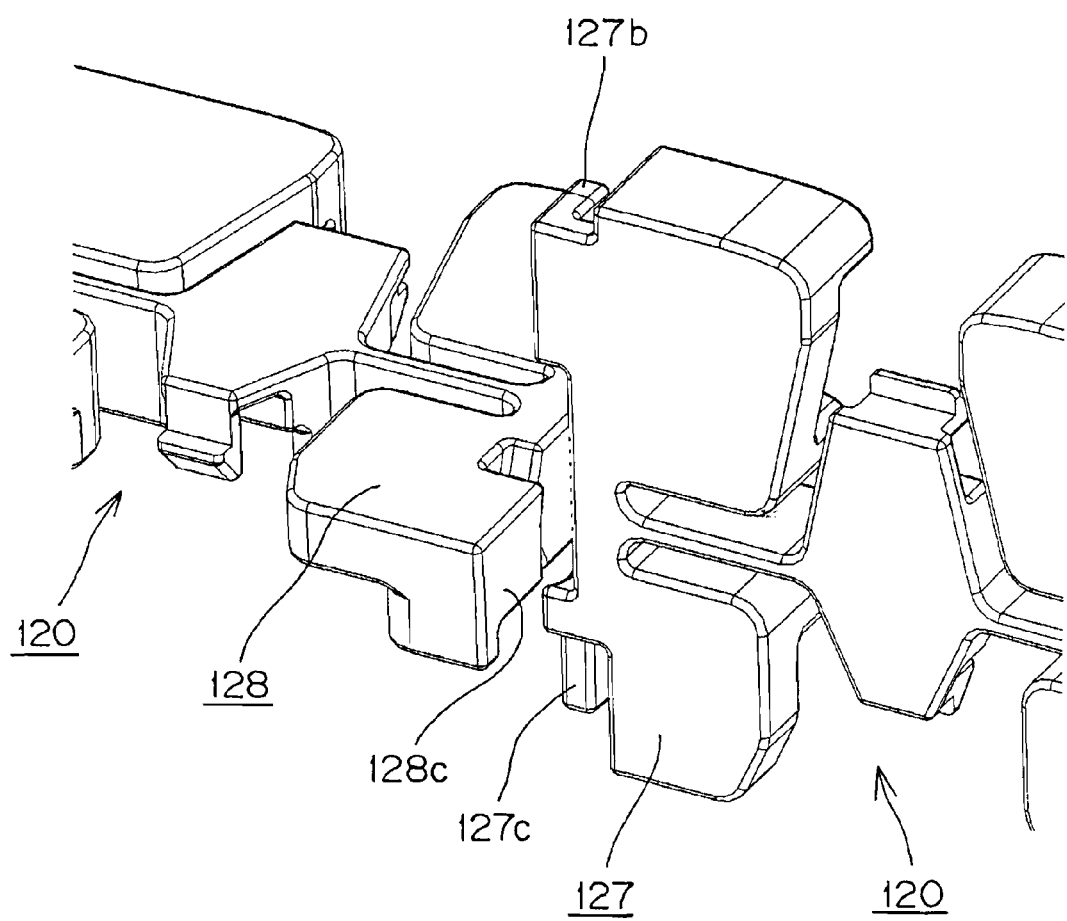
FIG. 10 is a view obtained when the male connecting plate and the female connecting plate are connected by a rotation type snap-fit mechanism (at the time of fitting between convex portion and concave portion).
Figure 11:
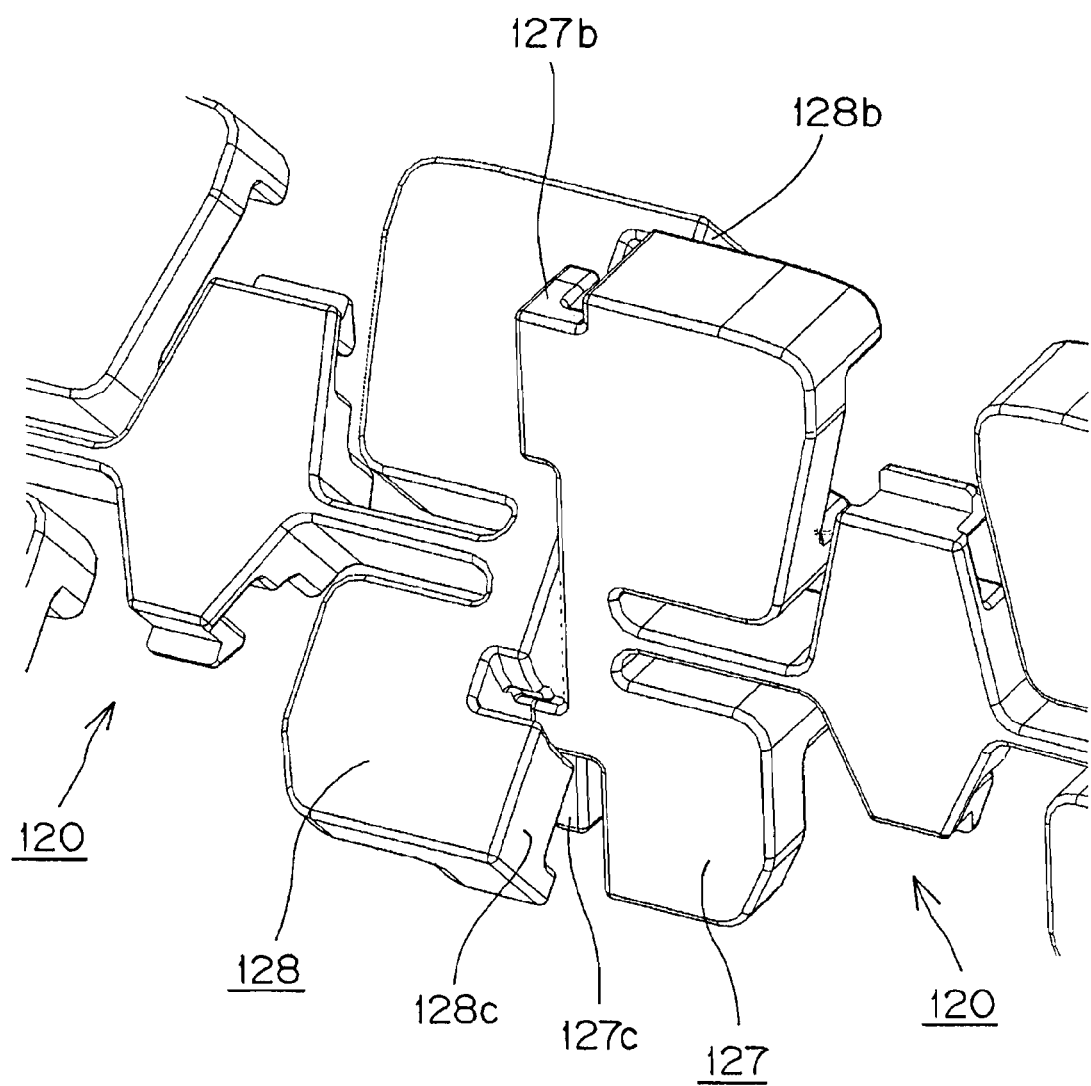
FIG. 11 is a view obtained when the male connecting plate and the female connecting plate are connected by a rotation type snap-fit mechanism (at the time of rotation).
Figure 12:
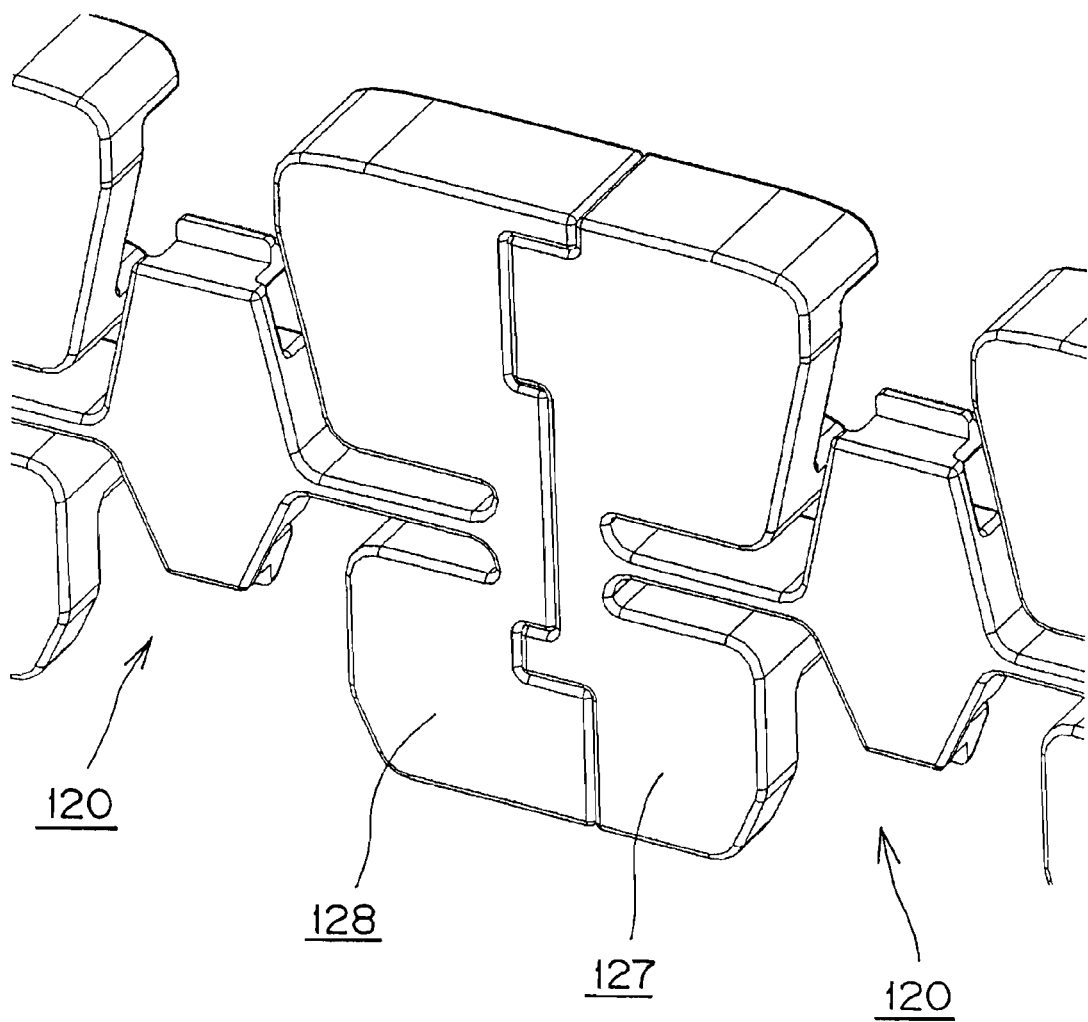
FIG. 12 is a view obtained when the male connecting plate and the female connecting plate are connected by a rotation type snap-fit mechanism (at the time of completion of connection).

The male connecting plate 127 and the female connecting plate 128 are connected to each other by a rotation type snap-fit mechanism as shown in FIGS. 9 to 12. First, as shown in FIG. 9, two link modules 120 are brought closer to each other in a direction substantially perpendicular to each other. The male connecting plate 127 and the female connecting plate 128 are opposed to each other. As shown in FIG. 10, the convex portion of the male connecting plate 127 and the concave portion of the female connecting plate 128 are fitted to each other. As shown in FIG. 11, both connecting plates 127 and 128 are rotated in opposite directions to each other using the fitted portion of the convex portion and concave portion as the center so that a surface of the male connecting plate 127 and a surface of the female connecting plate 128 abut or nearly abut. At this time, the upper engagement pawl portion 127b of the male connecting plate 127 and the upper engagement pawl portion 128b of the female connecting plate 128 engage each other and at the same time the lower engagement pawl portion 127c of the male connecting plate 127 and the lower engagement pawl portion 128c of the female connecting plate 128 engage each other. As shown in FIG. 12, the connection between the male connecting plate 127 and the female connecting plate 128 is completed and the obtained outer shape composed of the male connecting plate 127 and the female connecting plate 128 has the same outer shape as that of the side plate 122.

It is noted that although in the above-mentioned example a link module 120 composed of side plates 122 whose number is three, has been explained, the number of the side plates forming a link module is not only limited to 3 but also four and two or less may be adopted. Further, even zero, "0", which is the number of the side plates may be adopted. The number of the side plates can control fine (precise) adjustment of the whole length of the cable protection and guide device. FIG. 13 is a perspective view obtained when a link module 220 of side plates whose number is "0" was viewed from the outside. Both ends of flexible coupling arms 226 extend from a coupling portion 224 respectively have a male connecting plate 227 and a female connecting plate 228, which are respectively connected to adjacent link modules. FIG. 14 is a perspective view from the inside of the link module 220 as shown in FIG. 13, that is, from a cable accommodating space side. It is noted that the link module 220 of the side plates whose number is zero "0", shown in FIGS. 13 and 14, is the same as in the above-mentioned link module 120 insofar as the shapes of the male connecting plate, the female connecting plate, the coupling portion, and the functions. Thus the detailed explanations of the corresponding portions are omitted by denoting reference numerals of 200s in place of the reference numerals of 100s.

DESCRIPTION OF REFERENCE NUMERALS

100 . . . Cable protection and guide device
110 . . . Side plate 120, 220 ... Link module
122 ... Side plate
122a ... Upper engagement region (of side plate)
122b ... Lower engagement region (of side plate)
124, 224 ... Coupling portion
124a ... Upper end convex portion (of coupling portion)
124b ... Lower end convex portion (of coupling portion)
124c ... Arc-shaped convex portion (of coupling portion)
124d ... Cylindrical columnar convex portion (of coupling portion)
126, 226 ... Coupling arm
127, 227 ... Female connecting plate
127a, 227a ... Convex portion (of male connecting portion)
127b, 227b ... Upper engagement pawl portion (of male connecting portion)
127c, 227c ... Lower engagement pawl portion (of male connecting portion)
128, 228c ... Female connecting plate
128a, 228a ... Concave portion (of female connecting portion)
128b, 228b ... Upper engagement pawl portion (of female connecting portion)
128c, 228c ... Lower engagement pawl portion (of female connecting portion)
130 ... Stopper link
131 ... Upper concave portion (of stopper link)
132 ... Lower concave portion (of stopper link)
133 ... Coupling portion upper supporting portion (of stopper link)
134 ... Coupling portion lower supporting portion (of stopper link)
135 ... Engagement concave portion (of stopper link)
136 ... Circular recess portion (of stopper link)
137 ... Upper side convex portion (of stopper link)
138 ... Lower side convex portion (of stopper link)
139 ... Arc-shaped portion (of stopper link)
142 ... Fixed connecting arm
144 ... Opening/closing connecting arm
500 ... Cable protection and guide device
510 ... Side plate portion
520 ... Link module
522 ... Side plate
524 ... Coupling portion
526 ... Coupling arm
527 ... Connecting hook
527a ... Upper convex portion (of connecting hook)
527b ... Lower convex portion (of connecting hook)
527c ... Arc-shaped cut out portion (of connecting hook)
528 ... Connecting plate
528c ... Arc-shaped convex portion (outside connecting plate)
528d ... Arc-shaped convex portion (inside connecting plate)
528e ... Arc-shaped cut out portion (of connecting plate)
530 ... Stopper link
531 ... Upper concave portion (of stopper link)
532 ... Lower concave portion (of stopper link)
533 ... Coupling portion upper supporting portion (of stopper link)
534 ... Coupling portion lower supporting portion (of stopper link)
539 ... Arc portion (of stopper link)
540 ... Connecting arm Those skilled in the art will recognize that the invention has been set forth by way of example only and that changes may be made to the invention without departing from the spirit and the scope of the appended claims.

The invention claimed is:
1. A cable protection and guide device, comprising:
a plurality of adjacent left side link modules and a plurality of adjacent right side link modules;
each of said left side link modules includes a number of integrally molded spaced left side plates, said integrally molded spaced left side plates have a first outer shape;
each of said right side link modules includes a number of integrally molded spaced right side plates, said integrally molded spaced right side plates have a second outer shape;
said first outer shape of said integrally molded spaced left side plates and said second outer shape of said integrally molded spaced right side plates being the same;
each of said left side link modules includes integrally molded left side flexible coupling portions, said left side flexible coupling portions include arms extending from said left side flexible coupling portions interconnecting said spaced left side plates;
each of said right side link modules includes integrally molded right side coupling portions, said right side flexible coupling portions include arms extending from said right side flexible coupling portions interconnecting said spaced right side plates;
said number of integrally molded spaced left side plates are articulately and integrally connected to each other forming said left side link modules interconnected in a longitudinal direction from a mounting fixed end to a mounting movable end enabling said spaced left side plates to form a flexional circumferential bend having a flexional inner circumferential side and a flexional outer circumferential side;
said number of integrally molded spaced right side plates are articulately and integrally connected to each other forming said right side link modules interconnected in a longitudinal direction from a mounting fixed end to a mounting movable end enabling said spaced right side plates to form a flexional circumferential bend having a flexional inner circumferential side and a flexional outer circumferential side;
each of said spaced left and right side plates includes a flexional inner circumferential side residing during bending on said flexional inner circumferential side of said bend;
each of said spaced left and right side plates includes an outer circumferential side residing during bending on said outer flexional circumferential side of said bend;
pairs of stopper links;
fixed connecting arms;
each pair of said stopper links interconnected by one of said fixed connecting arms, said fixed connecting arms bridged over said flexional inner circumferential sides of said left and right side plates;
said stopper links snap fit into and engage said integrally molded left and right side coupling portions of said left and right side link modules;
rotatable connecting arms, said rotatable connecting arms are respectively bridged over said flexional outer circumferential sides of respective pairs of said left and right side plates of said left and right side link modules at intervals from said mounting fixed end toward said mounting movable end;
a cable accommodating space formed by said left and right side plates of said left and right side link modules, said stopper links, said fixed connecting arms, and said rotat- able connecting arms from said mounting fixed end toward said mounting movable end;

said cable accommodated in said cable accommodating space;

each of said left and right side link modules include a male connecting plate and a female connecting plate interconnected to said adjacent left and adjacent right side link modules, respectively; and, said male connecting plate and said female connecting plate of said adjacent left side link modules, when joined, form a third outer shape;

said male connecting plate and said female connecting plate of said adjacent right side link modules, when joined, form a fourth outer shape;

said third outer shape of said joined male connecting plate and said female connecting plate of said adjacent left side link modules and said fourth outer shape of said joined male connecting plate and said female connecting plate of said adjacent right side link modules being the same;

said first outer shape of said integrally molded spaced left side plates, said second outer shape of said integrally molded spaced right side plates, said third outer shape of said joined male connecting plate and said female connecting plate of said adjacent left side link modules, and, said fourth outer shape of said joined male connecting plate and said female connecting plate of said adjacent right side link modules being the same.

2. A cable protection and guide device according to claim 1, wherein:

said male connecting plate and said female connecting plate include end surfaces, said end surfaces include centers, said end surfaces have convex and concave portions at said centers thereof;

said male connecting plate and said female connecting plate connect said adjacent left and right side link modules; and, said male connecting plate and said female connecting plate include rotation type snap-fit mechanisms which are connected by engaging said convex portion and said concave portion and then rotating said male connecting plate and said female connecting plate in opposite directions to each other.

3. A cable protection and guide device according to claim 2, wherein:

each pair of said pair of stopper links includes a left stopper link and a right stopper link;

each of said rotatable connecting arms includes first and second ends;

each of said rotatable connecting arms is bridged over said flexional outer circumferential side of said spaced left and right side plates of said left and right side link modules;

said first end of each of said rotatable connecting arms being flexibly and integrally molded with one of said right and left stopper links; and said second end of each of said rotatable connecting arms being removably affixed to the other of said right and left stopper links.

4. A cable protection and guide device according to claim 1, wherein:

each pair of said pair of stopper links includes a left stopper link and a right stopper link;

each of said rotatable connecting arms includes first and second ends;

each of said rotatable connecting arms is bridged over said flexional outer circumferential side of said spaced left and right side plates of said left and right side link modules;

said first end of each of said rotatable connecting arms being flexibly and integrally molded with one of said right and left stopper links; and said second end of each of said rotatable connecting arms being removably affixed to the other of said right and left stopper links.

* * * * *